United States Patent
Chikahisa et al.

(10) Patent No.: US 9,293,116 B2
(45) Date of Patent: Mar. 22, 2016

(54) DISPLAY APPARATUS FOR VEHICLE HAVING TWO DISPLAY AREAS AND A POINTER IMAGE MOVABLE BETWEEN THE TWO DISPLAY AREAS

(75) Inventors: Yoshitaka Chikahisa, Handa (JP); Takeshi Tottori, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 741 days.

(21) Appl. No.: 13/134,939

(22) Filed: Jun. 21, 2011

(65) Prior Publication Data
US 2011/0316879 A1 Dec. 29, 2011

(30) Foreign Application Priority Data

Jun. 23, 2010 (JP) .................................. 2010-143195

(51) Int. Cl.
| | |
|---|---|
| *G06F 3/0481* | (2013.01) |
| *G09G 5/14* | (2006.01) |
| *G01C 21/36* | (2006.01) |
| *G06F 3/14* | (2006.01) |

(52) U.S. Cl.
CPC .............. *G09G 5/14* (2013.01); *G01C 21/3664* (2013.01); *G06F 3/04812* (2013.01); *G06F 3/14* (2013.01); *G09G 2360/06* (2013.01)

(58) Field of Classification Search
CPC .................................................. G06F 3/0481
USPC ......................................................... 715/776
See application file for complete search history.

(56) References Cited

U.S. PATENT DOCUMENTS

| | | | |
|---|---|---|---|
| 6,653,948 B1 * | 11/2003 | Kunimatsu et al. ...... 340/995.19 |
| 6,724,400 B1 * | 4/2004 | Anderson ...................... 715/764 |
| 2002/0131651 A1 * | 9/2002 | Anantharamu et al. ....... 382/284 |
| 2003/0210227 A1 * | 11/2003 | Smith .......................... 345/157 |
| 2005/0193350 A1 | 9/2005 | Ishiguro et al. |
| 2008/0150709 A1 | 6/2008 | Yamamoto et al. |
| 2010/0005414 A1 | 1/2010 | Ishiguro et al. |

FOREIGN PATENT DOCUMENTS

| | | |
|---|---|---|
| JP | 6-195056 | 7/1994 |
| JP | 8-305490 | 11/1996 |
| JP | 2005-242731 | 9/2005 |
| JP | 2007-213240 | 8/2007 |
| JP | 2007-310326 | 11/2007 |
| JP | 2008-40190 | 2/2008 |
| JP | 2008-195393 | 8/2008 |
| JP | 2010-108255 | 5/2010 |

* cited by examiner

*Primary Examiner* — Jennifer To
*Assistant Examiner* — Ashley Fortino
(74) *Attorney, Agent, or Firm* — Harness, Dickey & Pierce, P.L.C.

(57) ABSTRACT

A vehicular display apparatus is disclosed. A display screen has first and second display areas for displaying first and second images generated by first and second drawing units, respectively. The apparatus displays a pointer image on an active area, which is one of the first and second display areas. In response to an input of user movement request for moving the pointer image into an inner edge portion of the active area, the apparatus switches the active area from the one of the first and second to the other, and switches the one into an inactive area, and the second drawing unit starts superimposing the pointer image on the other, and the first drawing unit stops superimposing the pointer image on the one.

12 Claims, 6 Drawing Sheets

DISPLAY APPARATUS FOR VEHICLE HAVING TWO DISPLAY AREAS AND A POINTER IMAGE MOVABLE BETWEEN THE TWO DISPLAY AREAS

CROSS REFERENCE TO RELATED APPLICATION

The present application is based on and claims priority to Japanese Patent Application No. 2010-143195 filed on Jun. 23, 2010, disclosure of which is incorporated herein by reference.

BACKGROUND

1. Technical Field

The present invention relates to a vehicular display apparatus that is mounted to a vehicle, and that displays a first image generated by a first drawing unit and a second image generated by a second drawing unit.

2. Description of Related Art

A known vehicular display apparatus divides a display screen of a display unit, which is installed so as to face an occupant of a vehicle, into multiple display areas, and displays multiple images on respective display areas of the display screen. For example, a display apparatus disclosed in Patent Document 1 (JP-A-H06-195056) displays multiple images side by side on a monitor. The multiple images are for example a navigation image generated by a navigation controller, a TV screen image generated by a TV tuner and a decoder, or the like.

In Patent Document 2 (JP-A-2010-108255), a navigation electronic control unit (ECU) connected to an in-vehicle manipulation system generates an image in which a navigation image and an audio image are placed side by side. The navigation image relates to a navigation function and the audio image is for control of an audio function. On the display screen of a display unit, a pointer is superimposed on the image generated by the navigation ECU. The in-vehicle manipulation system can receive an input of user request. The user request may include a movement request for moving the display position of the pointer on the display screen, a change request for changing a display manner of the display screen into another display manner, and the like. In the above, the another display manner may be associated with a specific display position of the pointer In the above configuration, the navigation image and audio image are displayed side by side on the display screen of the display unit, and the pointer is superimposed on, for example, the navigation image out of the navigation image and audio image. In this state, when the movement request for moving the display position of the pointer into a display area of the audio image may be inputted to the in-vehicle manipulation system, the pointer becomes movable in the display area of the audio image. In addition, the display manner of the audio image become changeable in response to the change request inputted via an in-vehicle manipulation system.

In the configuration of Patent Document 2, the navigation image and the audio image are generated by the same drawing unit, which is the navigation ECU. Therefore; when the navigation ECU changes the display position of the pointer, the pointer on the display screen is freely movable from one display area for displaying the navigation image to another display area for displaying the audio image. Thus, the configuration disclosed in Patent Document 2 allows the display position of the pointer to move from one of the two display areas to the other of the two display areas with ease.

In recent years, the number of display pixels of a display unit has remarkably increased due to the trend toward a large-sized display unit and higher definition. Accordingly, a drawing unit should generate an image having the increased number of pixels in line with an increase in the number of display pixels of the display unit. However, from the viewpoint of the processing capacity of the drawing unit, it has become difficult for a single drawing unit to generate multiple images each having the increased number of pixels, and it has become difficult to display the multiple images side by side. It should be noted that, in Patent Document 2, multiple images to be displayed side by side are generated by a single drawing unit. Therefore, there is an increasing demand for a vehicular display apparatus that can displays, side by side, multiple images generated by different drawing units.

In this relation, when the navigation image and the TV screen image are generated by different drawing units (this is the case of Patent Document 1), operability may be degraded. Specifically, even when an input unit receives an input of the movement request for moving the display position of the pointer image from the display area of the navigation image into the display area of the TV screen image, the pointer image is not allowed to move into the display area of the TV screen image. Thus, the display manner of the TV screen image cannot be changed in response to the change request inputted via the input unit. As can be seen above, when a vehicular display apparatus is configured such that the multiple images to be displayed side by side are generated by different image units, operability may be degraded.

SUMMARY

The present invention is made in view of the foregoing difficulties. It is an objective of the present invention to provide a vehicular display apparatus capable of offering high usability even if multiple images are generated by different drawing units.

According to an aspect of the present invention, a vehicular display apparatus is mounted to a vehicle and configured to display a first image generated by a first drawing unit and a second image generated by a second drawing unit. The vehicular display apparatus includes a display screen, an input unit, and a switching unit. The display screen has a first display area for displaying the first image and a second display area for displaying the second image. The display screen displays a pointer image on one of the first display area and the second display area, the one being selected as an active area. The input unit is configured to receive an input of a user request. The user request includes a movement request for moving display position of the pointer image on the display screen and a change request for changing a display manner of the display screen into another display manner, the another display manner being associated with a specific display position of the pointer image. In response to the input of the movement request for moving the display position of the pointer image into an inner edge portion, which extends along a boundary line between the first display area and the second display area, of the active area, the switching unit (i) switches the active area from the one of the first display area and the second display area to the other of the first display area and the second display area and (ii) switches the one of the first display area and the second display area into an inactive area. In response to switching the active area from the first display area to the second display area and switching the first display area into the inactive area by the switching unit, (i) the second drawing unit starts superimposing the pointer image on the second image and causes the display manner of the second image to be changeable according to the change request at the display position of the pointer image and (ii) the first drawing unit stops superimposing the pointer image on the first image. In response to switching the active area from the second display area to the first display area and switching the second display area into the inactive area by the switching unit, (i) the first drawing unit starts superimposing the pointer image on the first image and causes the display manner of the first image to be changeable according to the change request at the display position of the pointer image and (ii) the second drawing unit stops superimposing the pointer image on the second image.

According to the above configuration, the vehicular display apparatus can offer high usability even if multiple images are generated by different drawing units.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Embodiments will be described below with reference to the accompanying drawings.

Figure 1:
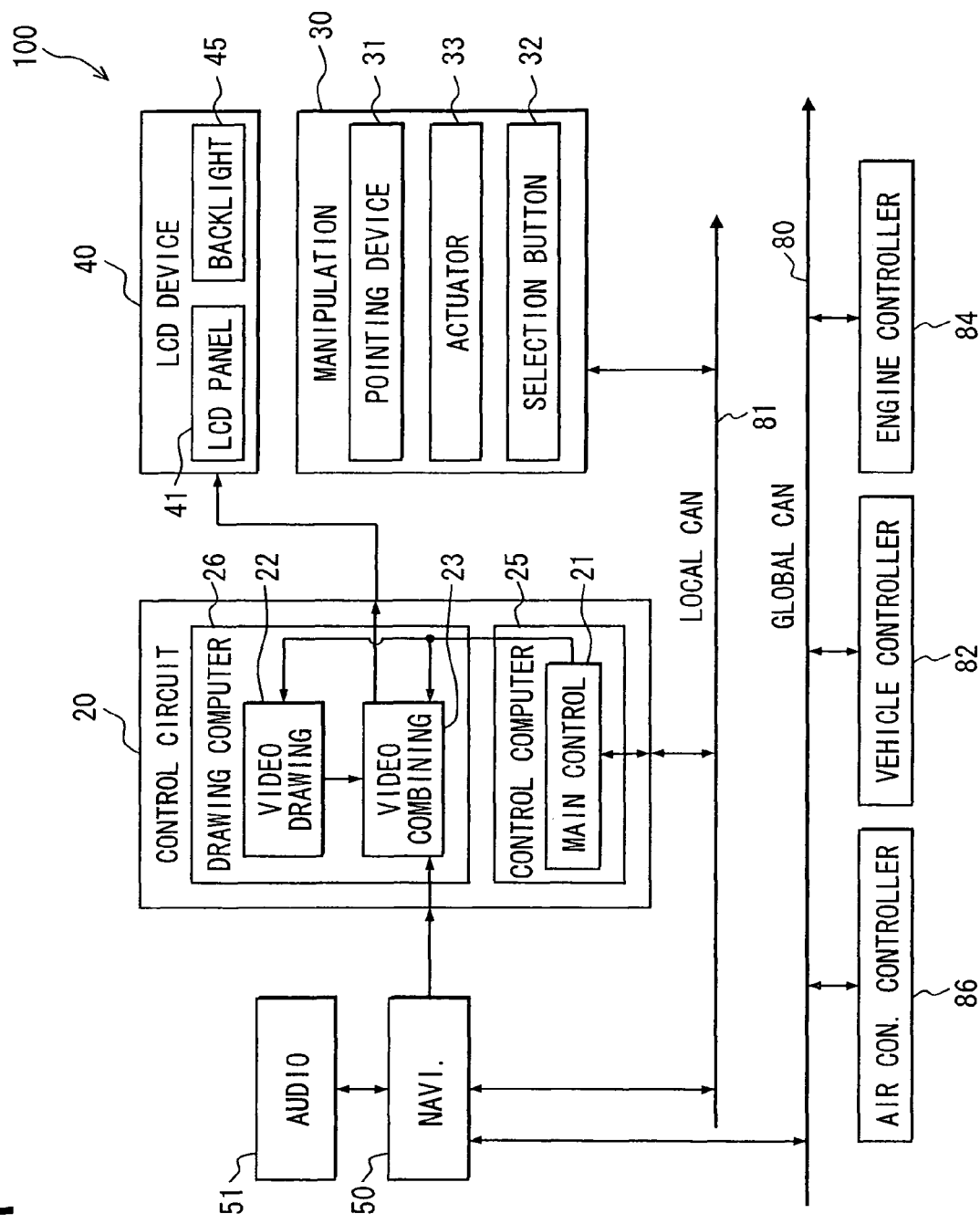
FIG. 1 is a diagram schematically illustrating a vehicular display apparatus of one embodiment.
Figure 2:
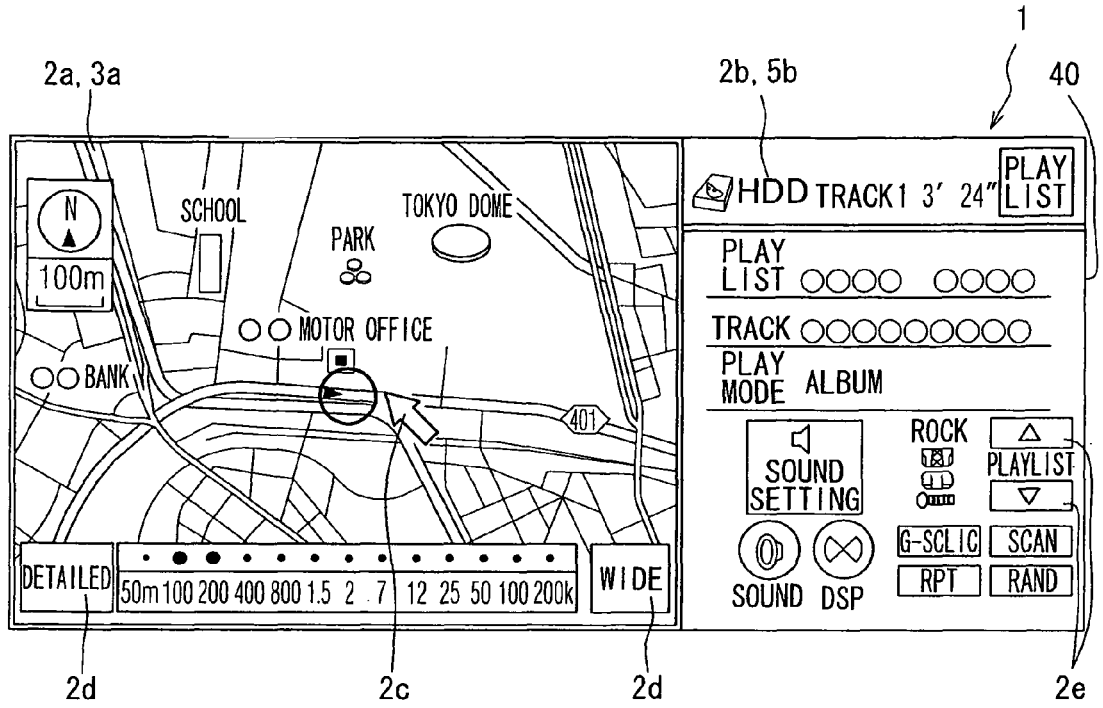
FIG. 2 is a diagram illustrating a display image generated by the vehicular display apparatus when a navigation image is selected as a principal image and an audio image is selected as a complement image.
Figure 3:
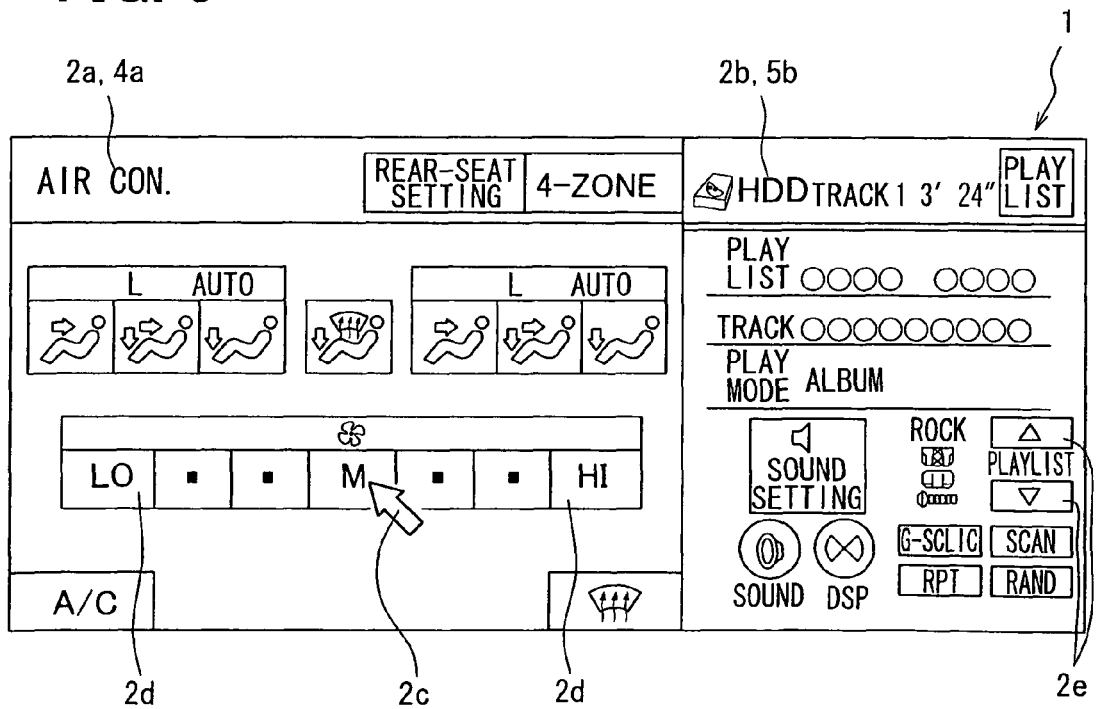
FIG. 3 is a diagram illustrating a display image generated by the vehicular display apparatus when an air condition information image is selected as the principal image and an audio image is selected as the complement image.
Figure 4:
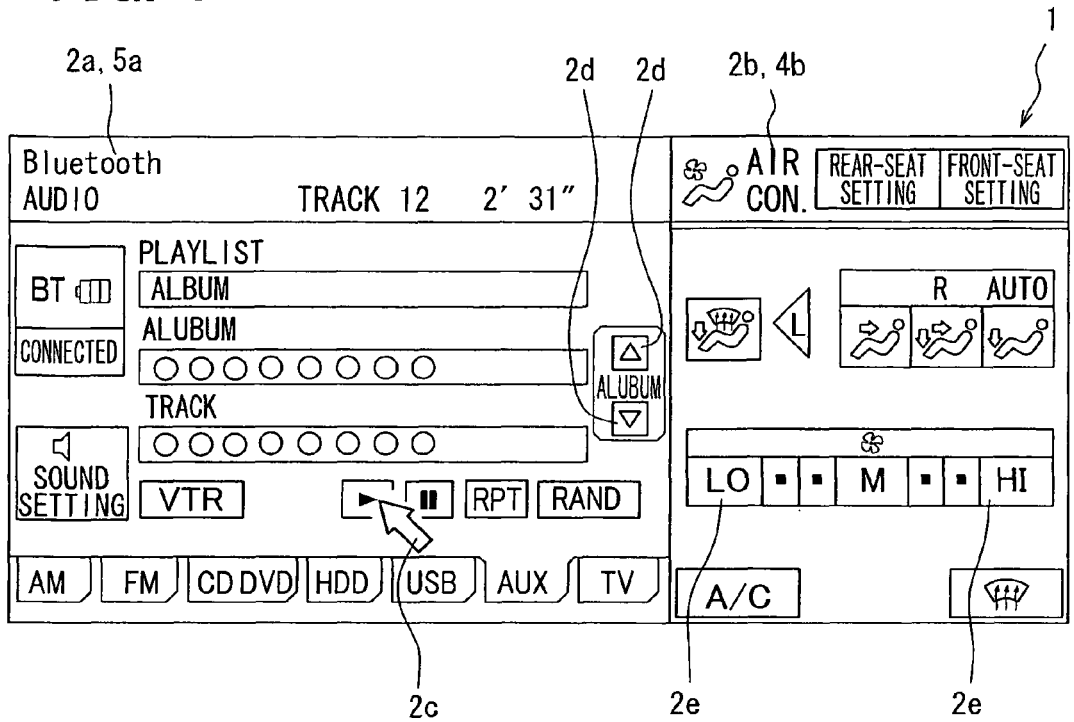
FIG. 4 is a diagram illustrating a display image generated by the vehicular display apparatus when an audio image is selected as the principal image and an air condition information image is selected as the complement image.

FIG. 1 is a diagram schematically illustrating a configuration of a vehicular display apparatus 100 of one embodiment. The vehicular display apparatus 100 is mounted in a vehicle and generates a display image 1 (e.g., see FIG. 2). The display image 1 is an image in which a principal image 2a and a complement image 2b are placed side by side. The display image 1 is displayed on a display screen 40a of a LCD (liquid crystal display) device 40 installed toward an occupant of the vehicle, whereby a variety of information is provided to the occupant who is visually recognizing the display image 1. For example, the display image 1 illustrated in FIGS. 2 to 4 is displayed on the LCD device 40.

Referring to FIG. 1, the configuration of the vehicular display apparatus 100 will be described below. The vehicular display apparatus 100 is connected with a global controller area network (CAN) 80 and a local CAN 81. The vehicular display apparatus 100 includes an operating device 30 (also called "manipulation device 30"), a navigation device 50, a control circuit 20, and the LCD device 40. These devices are all mounted in the vehicle.

The global CAN 80 and the local CAN 81 act as an in-vehicle network system, which uses a predetermined protocol to enable information exchange among apparatuses mounted in the vehicle. The global CAN 80 and the local CAN 81 are constructed such that various apparatuses are connected with a bus formed as two communication lines. In addition to the navigation device 50, various apparatus are connected to the global CAN. For example, a vehicle control apparatus 82 for comprehensively controlling the vehicle, an engine control apparatus 84 for controlling an internal combustion engine mounted in the vehicle, an air conditioner control apparatus 86 for controlling air-conditioning of a vehicle compartment, and the like are connected to the global CAN 80. These apparatus 82, 84, 86 output various information to the global CAN 80. The control circuit 20, the navigation device 50, and the operating device 30 are connected to the local CAN 81. In the above, the engine control apparatus 84 may be a driving power source control apparatus for controlling a driving power source of the vehicle such as an internal combustion engine, a motor etc and the like of a hybrid vehicle, an electric vehicle or the like.

The operating device 30 is an input interface that is placed on a center console between a driver seat and a passenger seat and may be manipulated mainly by a driver (who is an example of an occupant of the vehicle). The operating device 30 is manipulatable to allow a user to input a user request. The user request includes, for example, a movement request for moving the display position of a pointer image 2c on the display screen 40a (see FIG. 2 etc.), and a change request for changing a display manner of the display screen 40a into another display manner; the another display manner being associated with a specific display position of the pointer image 2c. The operating device 30 includes a pointing device 31, an actuator 33, and multiple selection buttons 32.

The pointing device 31 is manipulated to input data for moving the position of the pointer image 2c (see FIG. 2 or the like), which is drawn on the display image 1. Specifically, the pointing device 31 can allow a user to move the pointer image 2c within the display areas of the principal image 2a and complement image 2b. The pointing device 31 includes an operating knob protruding from the center console and is movable back, forth, right and left. The position of the pointing device 31, which is changeable in response to the driver's manipulation, is associated with the position of the pointer image 2c on the screen. Therefore, when the position of the pointing device 31 is moved back, forth, right or left by the driver, the position of the pointer image 2c on the display of the LCD device 40 is accordingly moved up, down, right or left.

In response to the driver's manipulation on the pointing device 31, the actuator 33 applies a response force to the pointing device 31. With the response force applied by the actuator 33, the driver receives a feedback against his or her manipulation from the pointing device through a tactile perception. For example, when the movement request is inputted to the pointing device 31 in order to place the pointer image 2c on an inner edge portion 42a or 43a extending along a boundary line 41a between a principal display area 42 and a complement display area 43 (see FIG. 6), the actuator 33 applies the response force to the pointing device 31. This allows the driver manipulating the pointing device 31 to perceive a "wall" on the boundary line 41a (see FIG. 6) via the tactile perception.

The selection button 32 is used to, for example, select a button image 2d, 2e (see FIG. 2 etc.), which is displayed at a specific display position on the display screen 40a. When the operating device 30 is manipulated in order to place the pointer image 2c (see FIG. 2 or the like) over the button image 2d, 2e and then the selection button 32 is depressed in order to input the change request, the display manner of the display screen 40a is changed into another display manner that is associated with the selected button image 2d, 2e.

Manipulation information includes information on user manipulation on the operating device 30. The manipulation information indicates the user request such as the movement request, the change request and the like. The operating device 30 outputs the manipulation information to the local LAN 81. The navigation device 50 and the control circuit 20 acquire the outputted manipulation information.

The navigation device 50 is connected with the global CAN 80, the local CAN 81, the audio apparatus 51, and the control circuit 20 etc. The navigation device 50 acquires vehicle information, which is outputted to the global CAN 80 from the vehicle control apparatus 82, the engine control apparatus 84, the air conditioner control apparatus 86, or the like. The navigation device 50 outputs the acquired vehicle information to the local CAN 81. In addition, the navigation device 50 acquires the manipulation information, which is outputted from the operating device 30 to the local CAN 81. The navigation device 50 includes a TV receiver for receiving a digital terrestrial broadcast, a global positioning system (GPS) receiver for locating the present position of the vehicle, an electronic compass for measuring an azimuth, and the like.

The audio apparatus 51 plays back a music data, a video data and the like stored in an optical disk (e.g., CD, DVD etc.) or a storage device (e.g., a hard disk drive, a flash memory etc.). To the navigation device 50, the audio apparatus 51 outputs track information, video information or the like associated with a currently-played-back track or video. The navigation device 50 acquires the track information and the video information, and outputs the acquired track information and video information to the local CAN 81. The track information includes, for example, track name, artist name, album name, album artwork image, playback time and the like.

Based on the vehicle information acquired from the global CAN 80 and position information from the GPS receiver and the electronic compass etc., the above navigation device 50 generates a navigation image 3a (see FIG. 2 for example), which guides a driver to a destination by assisting the driving operation of the driver. In addition, the navigation device 50 generates an air condition information image 4a (see FIG. 3), an audio image 5a (see FIG. 4), a TV screen image 9a (see FIG. 5) and the like. The TV screen image 9a is based on the terrestrial digital broadcasting received with the TV receiver. Details of these images 3a, 4a and 9a will be described later.

The navigation device 50 is connected with the control circuit 20 via a communication line. The navigation device 50 outputs an image signal of any one of the generated images 3a, 4a, and 9a to the control circuit 20 by a video output system such as, for example, GVIF (Gigabit Video Interface, registered trade mark) and the like.

The control circuit 20 is provided with a microcomputer 25 for control and another microcomputer 26 for drawing. The microcomputer 25 for control and the microcomputer 26 for drawing are referred to as "control microcomputer 25" and "drawing microcomputer 26", respectively. The control microcomputer 25 includes a processor performing various computation processes, a ROM (read-only memory) or a flash memory storing programs for the various computation processes, vehicle-related information for the various computation processes, and the like; a RAM (random access memory) functioning as a working space in computation operation, and the like. The control microcomputer 25 is connected with a communication interface (not shown) that is communicatable with the local CAN 81.

The drawing microcomputer 26 includes: a processor for performing various computation processes; a ROM or a flash memory storing programs, various image data and the like used for the various computation processes; a RAM functioning as a working space in computation operation; and the like. The drawing microcomputer 26 is connected with a video output interface (not shown) that outputs the video signal of the display image 1 to the LCD device 40.

The control circuit 20 with the above configuration includes a main control portion 21, a video drawing portion 22 and a video combining portion 23.

The main control portion 21 is a functional block of the control microcomputer 25. By executing a predetermined program, the control microcomputer 25 performs a function of the main control portion 21. The main control portion 21 determines the type of image to be displayed as the principal image 2a in the display image 1 and the type of image to be displayed as the complement image 2b in the display image 1, based on the manipulation information and the vehicle information outputted to the local CAN 81. Then, the main control portion 21 instructs the video drawing portion 22 and the video combining portion 23 to generate the display image 1. In addition, the main control portion 21 issues a command to the video drawing portion 22 to instruct the video drawing portion 22 to draw the pointer image 2c (see FIG. 2 etc.) on the display image 1.

Both of the video drawing portion 22 and the video combining portion 23 are functional blocks of the drawing microcomputer 26. By executing a predetermined program, the drawing microcomputer 26 performs a function of each of the video drawing portion 22 and the video combining portion 23.

The video combining portion 23 acquires a video signal of any one of the images 3a, 4a, 5a, 9a (see FIGS. 2 to 5) from the navigation device 50. The video combining portion 23 acquires one of the navigation image 3a, the air condition information image 4a, the audio image 5a, and the TV screen image 9a as the principal image 2a based on the video signal inputted from the navigation device 50.

The principal image 2a, which is to be acquired by the video combining portion 23, is generated as an image smaller in the number of pixels than the display image 1. Accordingly, the video drawing portion 22 generates the complement image 2b, which compensates for the difference in the number of pixels between (i) the principal image 2a acquired by the video combining portion 23 and (ii) the display image 1. The complement image 2b is drawn based on the vehicle information, track information, manipulation information, or the like acquired over the local CAN 81. An image generated as the complement image 2b is, for example, an audio image 5b (see FIG. 2, FIG. 3), the air condition information image 4b (see FIG. 4), or the TV control image 9b (see FIG. 5). The complement image 2b is outputted to the video combining portion 23.

The video combining portion 23 combines the principal image 2a, which is based on a video signal acquired from the navigation device 50, and the complement image 2b, which is drawn by the video drawing portion 22. Thereby, the video combining portion 23 generates the display image 1 in which the principal image 2a and complement image 2b are placed side by side. The video signal of the display image 1 is sequentially outputted from the control circuit 20 to the LCD device 40 by a video output system such as, for example, the low voltage differential signaling (LVDS) and the like. In this way, the control circuit 20 displays the display image 1 on the display screen 40*a* of the LCD device 40.

The LCD device 40 is placed at a center portion of an instrument panel in a vehicle compartment, The LCD device 40 displays the display image 1 on the display screen 40*a*, thereby providing a variety of information to the driver. The display screen 40*a* has a principal display area 42 for displaying the principal image 2*a* and a complement display area 43 for displaying the complement image 2*b*. The complement image is juxtaposed to the principal image 2*a*. On the display screen 40*a*, the pointer image 2*c* (see FIG. 2 or the like) is superimposed on one of the principal display area 42 and complement display area 43, the one being selected as an active area.

The LCD device 40 includes a LCD panel 41 and a backlight 49. The display screen 40*a* of the LCD panel 41 has, for example, 1280 display pixels in each horizontal row and 480 display pixels in each vertical row. That is, the number of display pixels of the display screen 40*a* is 1280 dots×480 dots. The principal display area 42 of the display screen 40*a* has the number of display pixels of 800 dots×480 dots. The complement display area 43 of the display screen 40*a* has the number of display pixels of 480 dots×480 dots. The backlight 49 illuminates the LCD panel 41 from the back side of the LCD I panel 41 in a display direction in a transmissive manner. The LCD device 40 acquires a video signal outputted from the control circuit 20 and controls each display pixel in the LCD panel 41, thereby displaying the display image 1 based on the video signal.

FIGS. 2 to 5 illustrate multiple examples of the display image 1 displayed on the LCD device 40. The display image 1 displayed on the LCD device 40 will be more specifically described below with reference to FIGS. 1 to 5.

First, the display image 1, the principal image 2*a*, and the complement image 2*b* will be explained in respect to the number of pixels. The number of pixels in the display image 1 corresponds to the number of pixels of the LCD device 40 and is 1280 dots×480 dots. The number of pixels in the navigation image 3*a* etc., which is used as the principal image 2*a*, is smaller than the number of pixels in the display image 1. The number of pixels in the principal image 2*a* is 800 dots×480 dots. The number of display pixels belonging to the principal display area 42 is determined in line with the number of pixels in the principal image 2*a*.

As mentioned above, the navigation device 50 can generate only an image that has a smaller number of pixels than the number of display pixels of the LCD device 40. By combining the principal image 2*a* and complement image 2*b*, it is possible to compensate for the difference in the number of pixels between the display image 1 and the principal image 2*a*. The complement image 2*b* is generated as an image that has the number of pixels of 480 dots×480 dots and that compensates for the difference between the number of display pixels of the display screen and the number of display pixels belonging to the principal display area (first display area).

The navigation image 3*a*, which serves as the principal image 2*a* in FIG. 2, includes a map image as its main component, the map image indicting the present position of the vehicle. The navigation image 3*a* can notify the driver of a variety of information such as the present position and the heading direction of the vehicle, a time required to arrive at the destination, and the like. The pointer image 2*c* and a button image 2*d* are drawn on the navigation image 3*a*. When the operating device 30 is manipulated in order to place the pointer image 2*c* on the button image 2*d* and when the selection button 32 is depressed in order to input the change request, the display manner is changed. For example, the map image in the navigation image 3*a* is scaled up or down.

The audio image 5*b*, which servers as the complement image 2*b* in FIG. 2, is generated by the video drawing portion 22 based on the track information acquired via the local CAN 81. This audio image 5*b* can notify the driver of the tile of the track currently played back by the audio apparatus 51, the album name and the like. When the operating device is manipulated in order to place the pointer image 2*c* over the button image 2*e* and then the selection button 32 is depressed in order to input the change request, the track, the volume, or the like is changed.

The air condition information image 4*a*, which serves as the principal image 2*a* in FIG. 3, is generated by the navigation device 50 based on the vehicle information outputted from the air conditioner control apparatus 86 to the global CAN 80. The air condition information image 4*a* can notify the driver of information about present setting of the air conditioner, e.g., information about air volume, wind direction, designated temperature and the like. The pointer image 2*c* and the button image 2*d* are drawn on the air condition information image 4*a*. When the operating device 30 is manipulated in order to place the pointer image 2*c* on the button image 2*d* and the selection button 32 is depressed in order to input the change request, the designated temperature, air volume, or the like for the air conditioner is changed. The audio image 5*b*, which serves as the complement image 2*b* in FIG. 3, is substantially identical to the complement image 2*b* described in conjunction with FIG. 2.

The audio image 5*a*, which serves as the principal image 2*a* in FIG. 4, is generated by the navigation device 50 based on the track information acquired from the audio apparatus 51. The audio image 5*a* can notify the driver of information that is substantially identical to the information provided by the audio image 5*a* (see FIG. 2 and FIG. 3) serving as the complement image 2*b*. In the audio image 5*a*, a title of the track currently being reproduced by the audio apparatus 51, an album name, and others are displayed. In the audio image 5*a*, the pointer image 2*c* and button images 2*d* are drawn. When the operating device 30 is manipulated in order to place the pointer image 2*c* over the button image 2*d* and then the selection button 32 is depressed in order to input the change request, the track, the volume or the like is changed.

The air condition information image 4*b*, which serves as the complement image 2*b* in FIG. 4, is generated by the video drawing portion 22 based on the vehicle information. The vehicle information used to generate the air condition information image 4*b* is transmitted from the air conditioner control apparatus 86 and acquired by the video drawing portion 22 over the global CAN 80 and local CAN 81. The air condition information image 4*b* can notify the driver of information that is substantially identical to the information provided by the air condition information image 4*a* (see FIG. 3) serving as the principal image 2*a*. In the air condition information image 4*b*, the present air condition setting information such as, for example, an air volume, airflow direction, designated temperature and the like are displayed. When a manipulation of placing the pointer image 2*c* over the button image 2*e* and then depressing the selection button 32 for the input of a change request is performed on the operating device 30, the set temperature, air volume, or the like of the air conditioner is changed.

Figure 5:
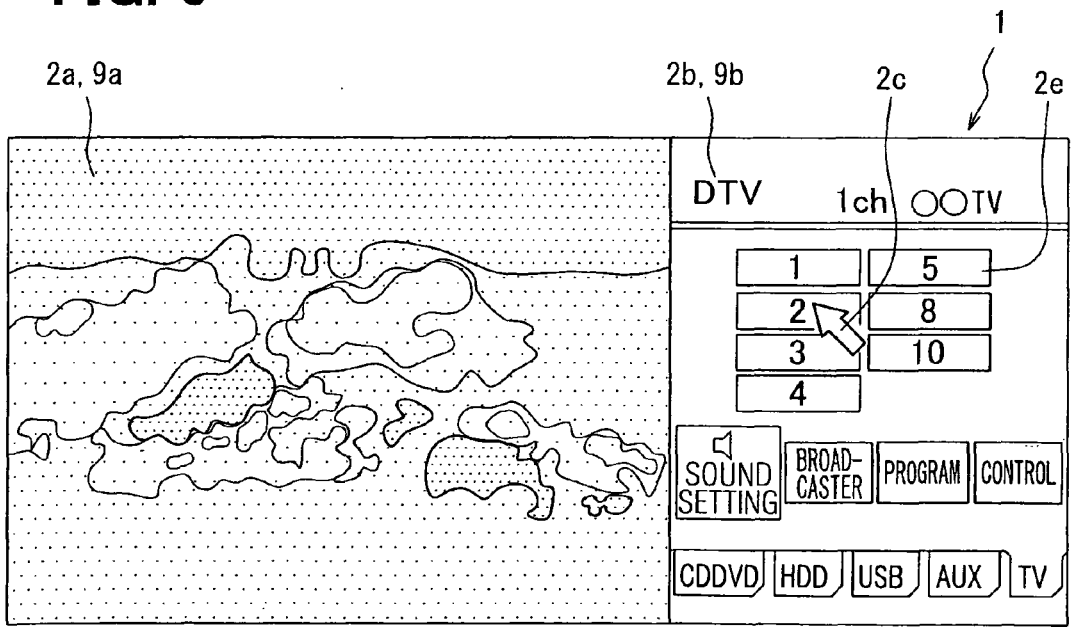
FIG. 5 is a diagram illustrating a display image generated by the vehicular display apparatus when a TV screen image is selected as the principal image and a TV control image is selected as the complement image.

The TV screen image 9*a*, which serves as the principal image 2*a* in FIG. 5, is generated by the navigation device 50. The complement image 2*b* placed next to the TV screen image 9*a* in FIG. 5 is a TV control image 9*b* for control of the TV screen image 9a. The TV control image 9b is generated by the video drawing portion 22 based on the received information acquired from the navigation device 50. In addition to name of a broadcaster providing the television broadcasting displayed on the TV screen image 9a, the multiple button images 2d for changing a reception target broadcaster are displayed on the TV control image 9b. When the operating device 30 is manipulated in order to place the pointer image 2c over the button image 2e and then the selection button 32 is depressed in order to input the change request, the TV screen image 9a is changed so that a broadcast received from the broadcasting station associated with the button image 2e is displayed.

It should be noted that combinations of the principal image 2a and the complement image 2b are not limited to those explicitly shown in FIGS. 2 to 5. The present embodiment covers the combinations that are not explicitly shown in FIGS. 2 to 5. In FIGS. 2 to 5, the principal image 2a is arranged on a left side portion of the display image 1 in the horizontal direction and the complement image 2b is arranged on a right side portion of the display image 1 in the horizontal direction. However, the positions of the principal image 2a and the complement image 2b may be interchanged according to the manipulation of the vehicle occupant or may be automatically interchanged.

As shown in FIGS. 6A to 6D, the display area to be selected as an active area is switched when the display position of the pointer image 2c is moved onto the inner edge portion 42a or the inner edge portion 43a, each of which extends along the boundary line 41a between the principal display area 42 and the complement display area 43. Details of operation of switching the active area will be detailed below.

Figure 6A:
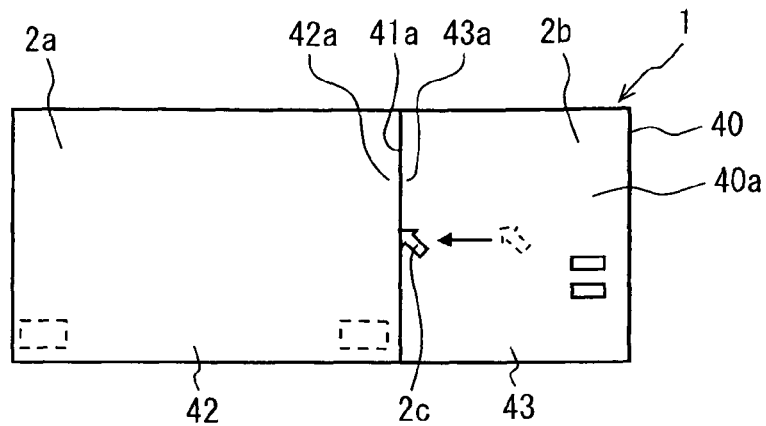
FIGS. 6A to 6D are diagrams illustrating how a display area for displaying a pointer image is switched between a principal display area and a complement display area.
Figure 6B:
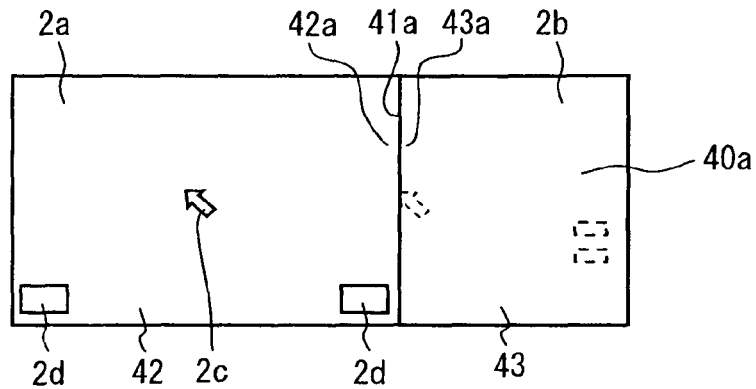

FIG. 6A illustrates a state where the complement display area 43 displaying the complement image 2b is selected as the active area, and the pointer image 2c is superimposed on the complement image 2b. In this state, the movement request for moving the display position of the pointer image 2c into the inner edge portion 43a of the complement display area 43 may be inputted to the operating device 30 (see FIG. 1), so that the pointer image 2c is located in the inner edge portion 43a. When the pointer image 2c stays in the inner edge portion 43a for a period of time longer than a preset period, the principal display area 42 is switched into the active area and the complement display area 43 is switched into the inactive area, as shown in FIG. 6B. In the above, the inner edge portion 43a of the complement display area 43 extends along the boundary line 41a.

Accordingly, in the display screen 40a, the pointer image 2c disappears from the complement image 2b on the complement display area 43, which is now the inactive area. And the pointer image 2c appears in the principal image 2a on the principal display area 42, which is now the active area. Then, the pointer image 2c becomes movable in the principal display area 42, which has been switched into the active area in response to the movement request inputted via the operating device 30 (see FIG. 1). Further, in response to the change request inputted via the operating device 30, the display manner of the principal image 2a displayed on the active has is changeable into another display manner. In the above, the another display manner may be associated with the button image 2d displayed on the principal image 2a.

Figure 6C:
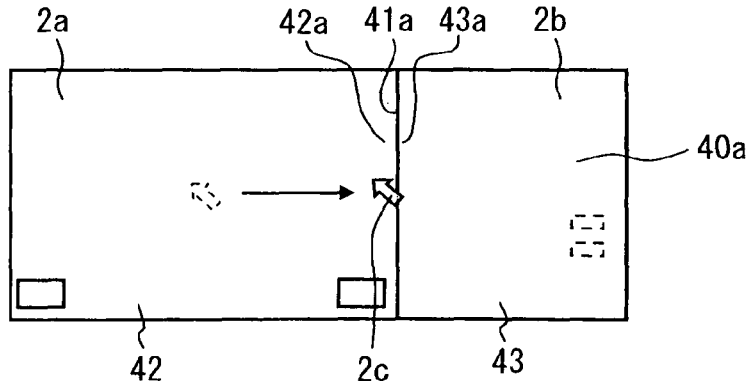
Figure 6D:
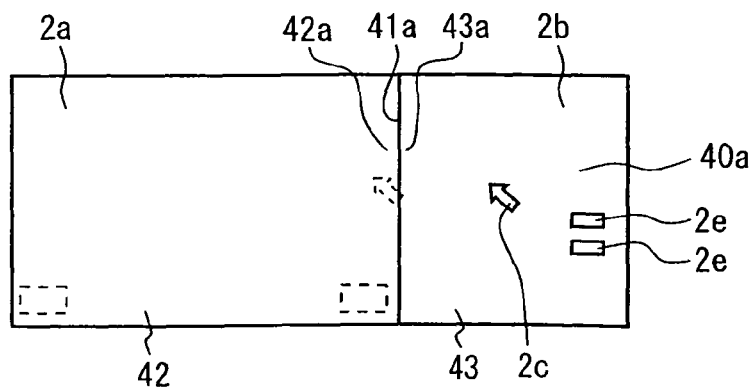

FIG. 6C illustrates a state where the principal display area 42 displaying the principal image 2a is selected as the active area and the pointer image 2c is superimposed on the principal image 2a. In this state, a movement request for moving the display position of the pointer image 2c into the inner edge portion 42a of the principal display area 42 may be inputted to the operating device 30 (see FIG. 1), so that the pointer image 2c is located in the inner edge portion 42a. In this case, when the pointer image 2c stays in the inner edge portion 42a for a period of time longer than a preset time, the complement display area 43 is switched into the active area and the principal display area 42 is switched into the inactive area, as shown in FIG. 6D.

Accordingly, in the display screen 40a, the pointer image 2c disappears from the principal image 2a on the principal display area 42, which is now the inactive area. And the pointer image 2c appears in the complement image 2b on the complement display area 43, which is now the active area. Further, the pointer image 2c becomes movable in the complement display area 43, which has become the active area in response to the movement request inputted via the operating device 30 (see FIG. 1). In addition, in response to a change request inputted via the operating device 30, the display manner of the complement image 2b on the active area is changeable into another display manner. In the above, the another display manner of the complement image 2b may be associated with the button image 2e on the complement image 2b.

Figure 7:
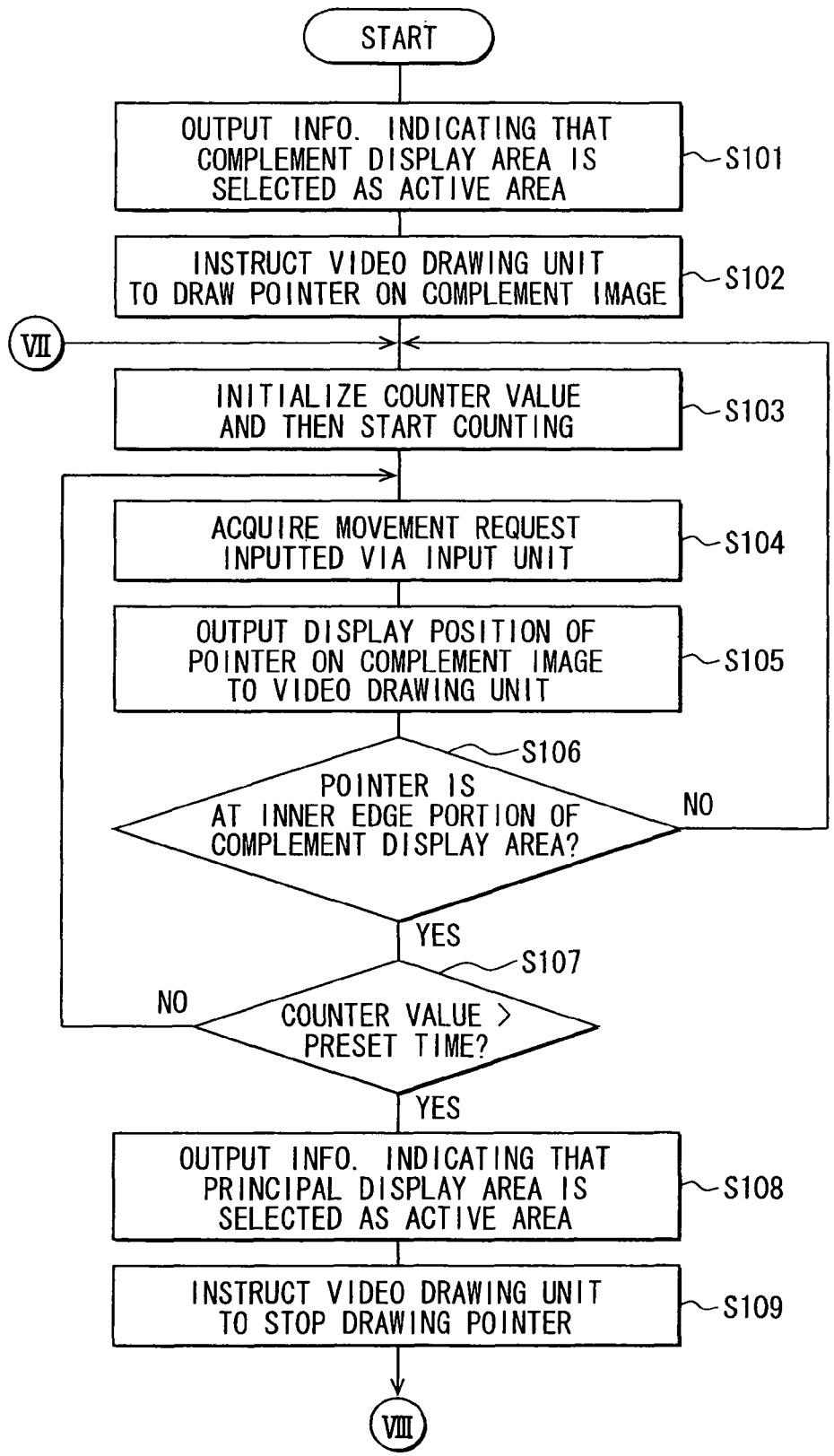
FIGS. 7 and 8 is a flowchart illustrating a control operation performed by a main control portion of a control circuit.
Figure 8:
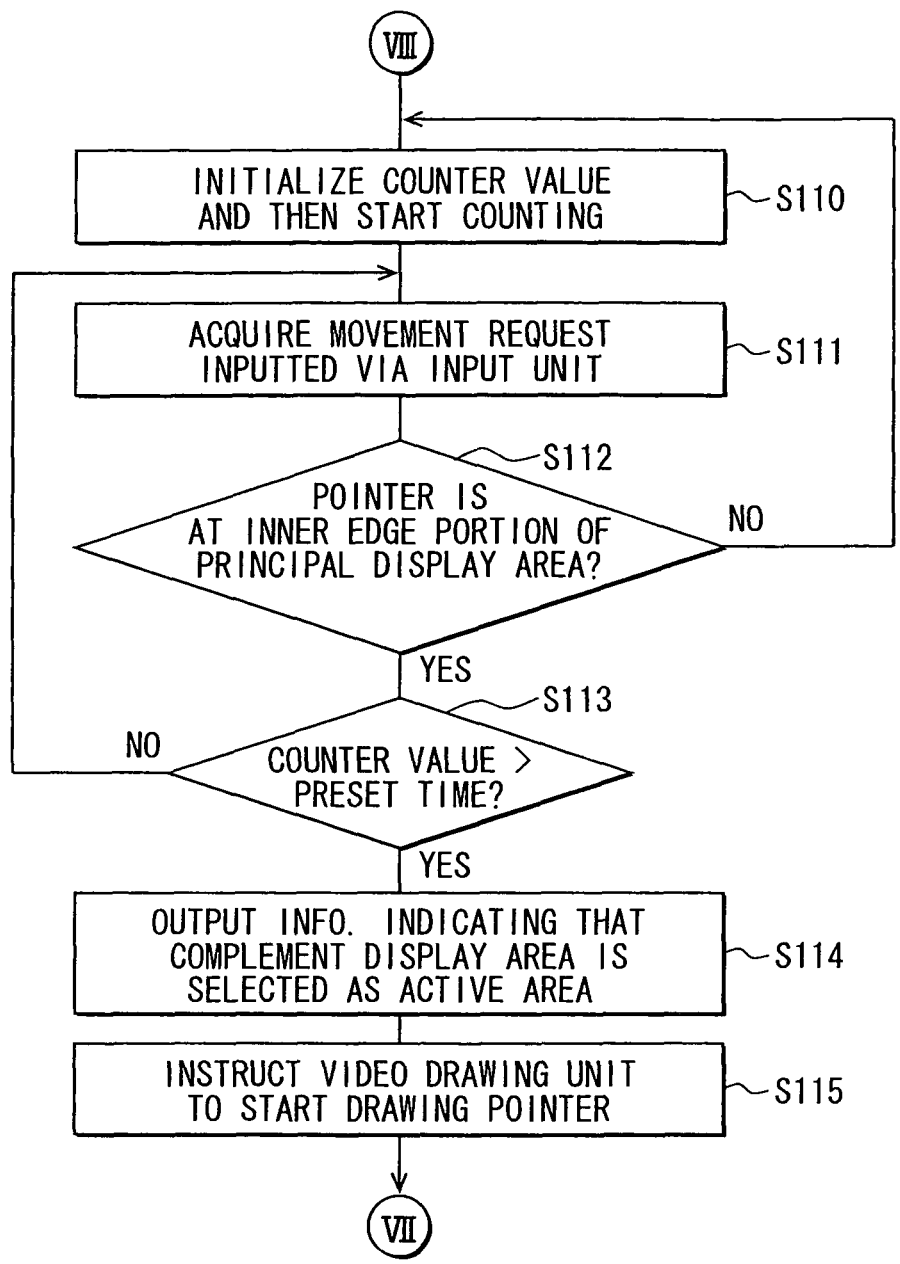

Next, an operation for switching the active area between the principal display area 42 and complement display area 43 will be, described below with reference to FIGS. 7 and 8. In the operation, the active area is switched in response to the input of the movement request from the occupant of the vehicle to the operating device 30. When the occupant of the vehicle turns on the accessory (ACC) power of the vehicle, the main control portion 21 of the control circuit 20 starts performing the operation described in FIGS. 7 and 8. The main control portion 21 repeats the operation until the accessory power of the vehicle is turned off.

At S101, to the local CAN 81, the main control portion 21 outputs information indicating, that the complement display area 43 is selected as the active area, and the operation proceeds to S102. The navigation device 50 acquires the information, which indicates that the complement display area 43 is the active area, via the local CAN 81. Accordingly, the navigation device 50 does not superimpose the pointer image 2c on the principal display area 42 that is now an inactive area and that displays, for example, the navigation image 3a.

At S102, to the video drawing portion 22, the main control portion 21 outputs a command requiring the video drawing portion 22 to draw the pointer image 2c on the complement image 2b, and the operation proceeds to S103. In response to the command sent from the main control portion 21, the video drawing portion 22 superimposes the pointer image 2c on, for example, the center of the complement image 2b as an initial position. Accordingly, on the display screen 40a of the LCD device 40, the pointer image 2c is displayed in the complement display area 43.

At S103, the main control portion 21 initializes value (counter value) of a counter that measures whether the pointer image 2c is continuously located in the inner edge portion 43a of the complement display area 43. Then, the main control portion 21 causes the counter starts counting, and the operation proceeds to S104. In the above, the inner edge portion 43a is a portion extending along the boundary line 41a between the principal display area 42 and complement display area 43.

At S104, via the local CAN 81, the main control portion 21 acquires the manipulation information on the movement request, which is inputted to the operating device 30 by manipulation on the operating device 30. The operation then proceeds to S105.

At S105, the main control portion 21 outputs a command associated with the display position of the pointer image 2c to the video drawing portion 22, based on the manipulation information acquired at S104. Specifically, position at which the pointer image 2c is to be superimposed is outputted to the video drawing portion 22. The processing then proceeds to S106. In response to the command sent from the main control portion 21, the video drawing portion 22 moves the superimposing position of the video drawing portion 22 on the complement image 2b. Accordingly, on the display screen 40a of the LCD device 40, the display position of the pointer image 2c is moved according to the movement request, which has been inputted to the operating device 30 by the manipulation on the operating device 30.

At S106, the main control portion 21 determines whether the pointer image 2c having moved at S105 is located in the inner edge portion 43a of the complement display area 43 along the boundary line 41a. When the main control portion 21 determines that the display position of the pointer image 2c is out of the inner edge portion 43a, corresponding to "NO" at S106, the operation returns to S103. When the main control portion 21 determines that the pointer image 2c is located in the inner edge portion 43a, corresponding to "YES" at S106, the operation proceeds to S107. In cases where the pointer image 2c is located in the inner edge portion 43a, the actuator 33 applies the response force to the pointing device 31 against the manipulation for the input of the movement request.

At S107, the main control portion 21 makes a determination of whether the value of the counter, which started counting at S103, exceeds a specific value of seconds. The specific value is a preset time. When the main control portion 21 determines that the value of the counter is equal to or smaller than the preset time, corresponding to "NO" at S107, the operation returns to S104. In contrast, when the main control portion 21 determines that the value of the counter exceeds the preset value, corresponding to "YES" at S107, the operation proceeds to S109. The preset time employed in making the determination at S108 may be arbitrarily and appropriately set.

At S108, the main control portion 21 switches the active area from the complement display area 43 to the principal display area 42 and switches the complement area into the inactive area. Accordingly, to the local CAN 81, the main control portion 21 outputs information indicating that the principal display area 42 is selected as the active area. The operation then proceeds to S109. When the navigation device 50 acquires the information, which indicates that the principal display area 42 is now the active area, over the local CAN 81, the navigation device 50 starts superimposing the pointer image 2c on the principal display area 42, which displays the navigation image 3a for example. Through the above operation, the pointer image 2c appears in the principal display area 42 of the display screen 40a (see FIG. 6B).

At S109, to the video drawing portion 22, the main control portion outputs a command requiring the video drawing portion 22 to stop drawing the pointer image 2c over the complement image 2b. The operation then proceeds to S110. In response to the command sent from the main control portion 21, the video drawing portion 22 stops superimposing the pointer image 2c over the complement image 2b. Accordingly, the pointer image 2c disappears from the complement display area 43 of the display screen 40a of the LCD device 40 (see FIG. 6B). Through the foregoing operation, the active area is switched from the complement display area 43 to the principal display area 42. Further, the complement display area 43 becomes the inactive area.

At S110, the main control portion 21 initializes value of the counter and causes the counter to start counting. In the above, the counter measures whether the pointer image 2c is continuously located in Me inner edge portion 42a of the principal display area 42. In the above, the inner edge portion 42a is a portion extending along the boundary line 41a between the principal display area 42 and complement display area 43. After S110, the operation proceeds to S111.

At S111, over the local CAN 81, the main control portion 21 acquires the manipulation information on the movement request, which has been inputted to the operating device 30 by the manipulation on the operating device 30. At S111, over the local CAN 81, the navigation device 50 also acquires the manipulation information on the movement request inputted to the operating device 30, and changes a superimposing position of the pointer image 2c (position at which the pointer image 2c is superposed) based on the acquired manipulation information. Accordingly, the display position of the pointer image 2c is moved on the display screen 40a of the LCD device 40 according to the movement request, which has been inputted to the operating device 30 by the manipulation on the operating device 30. After S111, the operation proceeds to S112.

At S112, the main control portion 21 determines whether the pointer image 2c is located in the inner edge portion 42a of the principal display area 42 along the boundary line 41a. When the main control portion 21 determines that the display position of the pointer image 2c is out of the inner edge portion 42a, corresponding to "NO" at S112, the operation returns to S110. When the main control portion 21 determines that the pointer image 2c is located in the inner edge portion 42a, the operation proceeds to S113. Further, in cases where the pointer image 2c is located in the inner edge portion 42a, the actuator 33 applies the response force to the pointing device 31 against the manipulation for the input of the movement request.

At S113, the main control portion 21 makes a determination of whether the value of the counter, which started counting at S110, exceeds a specific value of seconds, which is a preset time. When the main control portion 21 determines that the value of the counter is equal to or smaller than the preset value, corresponding to "NO" at S113, the operation returns to S111. When the main control portion 21 determines that the value of the counter exceeds the preset value, corresponding to "YES" at S114, the operation proceeds to S114. In the above, the preset time employed in making the determination at S113 may be arbitrarily and appropriately set.

At S114, the main control portion 21 switches the active area from the principal display area 42 to the complement display area 43 and switches the principal display area 42 into the inactive area. Further, to the local CAN 81, the main control portion 21 outputs the information indicating that the complement display area 43 is selected as the active area. Then, the operation proceeds to S115. The navigation device 50 acquires the information, which indicates that the complement display area 43 is now the active area, over the local CAN 81, and stops superimposing the pointer image 2c on the principal display area 42, which displays, for example, the navigation image 3a. Through the above operation, the pointer image 2c disappears from the principal display area 42 of the display screen 40a (see FIG. 6D).

At S115, to the video drawing portion 22, the main control portion outputs a command requiring the video drawing portion 22 to starts drawing the pointer image 2c over the complement image 2b, and the operation returns to S103. In connection with the above, the video drawing portion 22 starts superimposing the pointer image 2c on the complement image 2b in response to the command sent from the main control portion 21. Accordingly, the pointer image 2c appears in the complement display area 43 of the display screen 40a of the LCD device 40 (see FIG. 6D). Through the operation from S110 to S116, the active area is switched from the principal display area 42 to the complement display area 43. Further, the principal display area 42 becomes the inactive area.

According to the above-described embodiment, the principal display area 42 and the complement display area 43 are switchable into the active area or the inactive area in response to the movement request inputted to the operating device 30. As for the active area, it is possible to change the display manner of an image on the active area by inputting the change request to the operating device 30. Therefore, the vehicular display apparatus 100 can offer high operability even though the principal image 2a and complement image 2b are, respectively, generated by the navigation device 50 and the video drawing portion 22, which act as different drawing units.

In addition, since the vehicular display apparatus 100 is mounted in the vehicle, the manipulation on the operating device 30 by an occupant of the vehicle to move the pointer image 2c may not be high-precision because of vibrations or the like of the vehicle. Thus, one may consider a possibility that, despite the absence of an occupant's intention of switching the active area, the movement request may be accidentally inputted to the operating device 30 to move the display position of the pointer image 2c into the inner edge portion 42a or the inner edge portion 43a extending along the boundary line 41a.

The present embodiment can address the above probable difficulty. Specifically, according to the present embodiment, unless the pointer image 2c stays in the inner edge portion 42a or the inner edge portion 43a for a period of time longer than a preset time, the main control portion 21 does not switch the active area from one of the principal display area 42 and complement display area 43 to the other. Thus, even if the movement request for moving the display position of the pointer image 2c into the inner edge portion 42a or the inner edge portion 43a is accidentally inputted to the operating device 30, it is possible to suppress an occurrence of the accidental or unintentional switching the active area. Further, when the movement request for moving the pointer image 2c into the inner edge portion 42a or the inner edge portion 43a is inputted to the operating device 30 for the period of time longer than the preset time with the intention of switching the active area, the active area is certainly switched from one of the principal display area 42 and complement display area 43 to the other. Therefore, the vehicular display apparatus 100 can switch the active area while reliably reflecting an occupant's intention of switching the active area. As a result, it is possible further improve the operability of the vehicular display apparatus 100.

Furthermore, according to the present embodiment, when the movement request for placing the pointer image 2c in the inner edge portion 42a or the inner edge portion 43a is inputted to the operating device 30, the actuator 33 applies the response force to the pointing device 31 against the manipulation for the input of the movement request. Thus, only when an occupant of the vehicle has the intention of switching the active area, the occupant can keep inputting the movement request against the response force, which is applied by the actuator 33, in order to place the pointer image 2c on the inner edge portion 42a or inner edge portion 43a. Therefore, the vehicular display apparatus 100 can switch the active area while further reliably reflecting the occupant's intention of switching the display position of the pointer image 2c. As a result, it is possible to improve the operability of the vehicular display apparatus 100.

Furthermore, according to the present embodiment, the number of display pixels belonging to the principal display area 42 is determined in accordance with the number of pixels constituting the principal image 2a. The complement image 2b compensates for the difference between the number of display pixels arrayed in the display screen 40a and the number of display pixels belonging to the principal display area 42. Therefore, even when the number of pixels of the principal image 2a generated by the navigation device 50 is smaller than the number of display pixels arrayed in the display screen 40a, the vehicular display apparatus 100 can efficiently use all the display pixels in the display screen 40a while using the principal image 2a.

In the above-described configuration, even in the case of an increase in the number of display pixels of the display screen 40a, it is possible to continue to use the existing navigation device 50 for generating the principal image 2a by adjusting the number of pixels of the complement image 2b, which is generated by the video drawing portion 22. Therefore, an amount of work needed to design the vehicular display apparatus 100 can be reduced. As a result, it is possible to readily provide the vehicular display apparatus 100 having high operability.

In typical, a navigation device 50 generates a navigation image 3a through remarkably-complicated processes. For example, the navigation image 3a is generated through superimposition of multiple layers on which the map image, the button image 2d, the pointer image 2c and the like are drawn. Therefore, the increase in the number of pixels of the navigation image 3a typically requires an increase in the processing capacity of the navigation device 50 and a large amount of work for specification change of the navigation device 50. However, the present embodiment can address the above probable difficulty. Specifically, as described above, the vehicular display apparatus 100 of the present embodiment can cope with the increase in the number of display pixels of the display screen 40a while using the navigation image 3a produced by the existing navigation device 50. In this case, the processing capacity of the navigation device 50 can be kept unchanged, and, the work for specification change can be omissible. As can be seen from the above, since the navigation image 3a generated by the existing navigation device 50 can be used as the principal image 2a, the vehicular display apparatus 100 offering high operability can more readily provided.

In the present embodiment, the principal image 2a can correspond to a first image. The complement image 2b can correspond to a second image. The main control portion 21 can correspond to a switching unit. The video drawing portion 22 can correspond to a second drawing unit. The operating device 30 can correspond to an input unit. The actuator 33 can correspond to a response force applying unit. The principal display area 42 can correspond to a first display area. The complement display area 43 can correspond to a second display area. The navigation device 50 can correspond to a first drawing unit.

Other Embodiments

Embodiments of the present invention are not limited to the above embodiments. Examples of other embodiments will be described below.

In the above embodiment, in response to the placing the pointer image 2c in the inner edge portion 42a of the principal display area 42 or the inner edge portion 43a of the complement display area 43 for a period of time longer than the preset time, the active area is switched. As mentioned above, the preset time may be appropriately changed and set. Alternatively, when the movement request for moving the pointer image 2c into the inner edge portion 42a of the principal display area 42 or the inner edge portion 43a of the complement display area 43 is inputted to the operating device 30 by the manipulation on the operating device 30, the vehicular display apparatus may switch the active area from one of the principal display area 42 and complement display area 43 to the other.

In the above embodiment, the navigation image, the air condition information image, and the audio image etc. are described as examples of the principal image 2a and the complement image 2b. However, a variety of images for notifying information to the occupant of the vehicle can be used as the principal image 2a and the complement image 2b. For example, if the vehicle is equipped with sonar for detecting an obstacle around the vehicle, an image for notifying a driver of information about a detection result of the sonar may be displayed as the principal image or the complement image 2b on the display screen 40a. Alternatively, if an external device such as portable music player, a cellular phone and the like is connected to the audio section 51, a control image for allowing the occupant to control the external device via the operating device 30 may be displayed as the principal image 2a or the complement image 2b on the display screen 40a.

In the above embodiment, the operating device 30 includes the actuator 33 for applying the response force to the pointing device 31. Alternatively, the actuator 33 for applying the response force may not be included in the operating device 30. Alternatively, the pointing device of the operating device may include: a joystick, which inputs the movement request in response to a pivot manipulation on a lever; a touch pad, which inputs the movement request in response to a touch manipulation on a planer sensor; a dial mechanism, which inputs the movement request in response to a rotation manipulation on a cylindrical dial; or the like. Alternatively, the vehicular display apparatus may use a touch sensitive panel as the operating device. The touch sensitive panel may have a pressure sensor, a capacitance sensor or the like in the form of a transmissive plate arranged on a display side of the LCD panel 41.

In the above embodiment, out of the display pixels in the display screen 40a, the number of display pixels allocated to the principal display area 42 is prescribed so as to correspond to the number of pixels constituting the principal image 2a such as the navigation image 3a and the like. The number of display pixels belonging to the principal display area 42 may be larger or smaller than the number of pixels of the principal image 2a. The number of display pixels belonging to the principal display area 42 may be larger or smaller than the number of pixels belonging to the complement display area 43. For example, the number of display pixels of 480 dots× 480 dots may be allocated to the principal display area 42, and the number of display pixels of 800 dots×480 dots may be allocated to the complement display area 43.

In the above embodiment, the control circuit 20 includes the main control portion 21, the video drawing portion 22 and the video combining portion 23, which are provided as functional blocks of two microcomputers. Specifically, the main control portion 21 is a functional block of the control microcomputer 25. The video drawing portion 22 and the video combining portion 23 are functional blocks of the drawing microcomputer 26. However, a configuration of the control circuit 20 is not limited to that described in the above embodiment. For example, the main control portion 21, the video drawing portion 22 and the video combining portion 23 may be functional blocks of a single microcomputer mounted to the control circuit 20. Alternatively, the control circuit 20 may include an analog circuit that is configured to function as the main control portion 21, the video drawing portion 22 and the video combining portion 23 without executing a program.

In the above embodiment, after the vehicle information outputted to the global CAN 80 is acquired by the navigation device 50, the vehicle information is outputted from the navigation device 50 to the local CAN 81, and then acquired by the control circuit 20. Alternatively, the control circuit 20 may be directly connected with the global CAN 80, and may acquire the vehicle information not via the local CAN 81 but via the global CAN 80.

In the above embodiment, the LCD device 40 has the number of display pixels of 1280 dots×480 dots. However, the number of display pixels of the LCD device 40 is not limited to the above embodiment. For example, the vehicular display apparatus may include the LCD device with the number of display pixels larger than 1280 dots×480 dots. Alternatively, the vehicular display apparatus may be provided with a display device other than the LCD device having the LCD panel. For example, the vehicular display apparatus may be provided with a display device having a plasma display panel, an organic light emitting display panel, or the like.

(Aspects)

According to an aspect of the present disclosure, a vehicular display apparatus may be configured in the following way. The vehicular display apparatus is mounted to a vehicle and configured to display a first image generated by a first drawing unit and a second image generated by a second drawing unit. The vehicular display apparatus includes a display screen, an input unit, a switching unit. The display screen has a first display area for displaying the first image and a second display area for displaying the second image. The display screen displays a pointer image on one of the first display area and the second display area, the one being selected as an active area. The input unit is configured to receive an input of a user request. The user request includes: a movement request for moving display position of the pointer image on the display screen; and a change request for changing a display manner of the display screen into another display manner, the another display manner being associated with a specific display position of the pointer image. In response to the input of the movement request for moving the display position of the pointer image into an inner edge portion, which extends along a boundary line between the first display area and the second display area, of the active area, the switching unit (i) switches the active area from the one of the first display area and the second display area to the other of the first display area and the second display area and (ii) switches the one of the first display area and the second display area into an inactive area. In response to switching the active area from the first display area to the second display area and switching the first display area into the inactive area by the switching unit, (i) the second drawing unit starts superimposing the pointer image on the second image and causes the display manner of the second image to be changeable according to the change request at the display position of the pointer image and (ii) the first drawing unit stops superimposing the pointer image on the first image. In response to switching the active area from the second display area to the first display area and switching the second display area into the inactive area by the switching unit, the first drawing unit starts superimposing the pointer image on the first image and causes the display manner of the first image to be changeable according to the change request at the display position of the pointer image and the second drawing unit stops superimposing the pointer image on the second image.

In the above configuration, the first display area displays the first image and the second display area displays the second image so that the first and second images are displayed side by side. The pointer image is superimposed on one of the first and second display areas that is selected as the active area. In this state, when the input unit receives the input of the movement request for moving the display position of the pointer image into the inner edge portion, which extends along the boundary line between the first display area and the second display area, of the active area, the switching unit switches the active area from the one of the first and second display areas to the other of the first and second display areas, and switches the other of the first and second display areas in the inactive area.

One of the first and second drawing units, the one generating the image for the display area having been switched into the inactive area by the switching unit, stops superimposing the pointer image on the image for the inactive area. The other of the first and second drawing units, the other generating an image for the display area having been switched into the active area by the switching unit starts superimposing the pointer image on the image for the active area. Accordingly, on the display screen, the pointer image disappears from the image displayed in the display area that has become the inactive area, and, the pointer image appears on the image displayed in the display area that has become the active area. Further, the pointer image becomes movable in the display area that has become the active area in response to the movement request inputted to the input unit. A change in the display manner of the image in the active area into another display manner in response to the change request inputted to the input unit is allowed. The another display manner may be associated with a specific display position of the pointer image on the image in the active area.

As can be seen from the above, even if the first image and the second image are respectively generated by the first drawing unit and the second drawing unit, the first display area and the second display area are switched into the active area or the inactive area in response to the movement request inputted to the input unit to move the pointer image. Therefore, the pointer image can be moved in the first display area and the second display area. As for the active area, the display manner of the image displayed in the active area can be changed in response to the change request. Therefore, even if the first image and the second image are generated by the different drawing units, the vehicular display system can offer high operability.

In the above configuration, since the vehicular display apparatus is mounted in the vehicle, the manipulation on the input unit by an occupant of the vehicle to move the pointer image may not be high-precision because of vibrations or the like of the vehicle. Thus, one may consider a possibility that, despite the absence of an occupant's intention of switching the active area from one of the first display area and the second display area to the other, the input unit may accidentally receive the movement request for moving the display position of the pointer image into the inner edge portion of the active area along the boundary line.

To address the above probable difficulty, the vehicular display apparatus may be configured in the following way. In response to the input of the movement request for placing the display position of the pointer image in the inner edge portion of the active area for a period of time longer than a preset period, the switching unit (i) switches the active area from the one of the first display area and the second display area to the other of the first display area and the second display area and (ii) switches the one of the first display area and the second display area into the inactive area.

According to the above configuration, unless the pointer image stays in the inner edge portion along the boundary line between the first display area and the second display area for a period of time longer than a preset time, the switching unit does not switch the active area from one of the first display area and the second display area to the other. Thus, even if the movement request for moving the display position of the pointer image into the inner edge portion is accidentally inputted to the operating device 30, it is possible to suppress an occurrence of the accidental or unintentional switching the active area. When the movement request for positioning the pointer image on the inner edge portion for the period of time longer than the preset time is inputted to the input unit with the intention of switching the active area, the active area is switched from one of the first display area and the second display area to the other. Thus, in switching the active area, the vehicular display system can reliably reflect the occupant's intention of switching the active area. As a result, it is possible further improve the operability of the vehicular display apparatus.

The above vehicular display apparatus may further include a response force applying unit. In response to the input of the movement request for moving the display position of the pointer image into the inner edge portion of the active area, the response force applying unit applies a response force to the input unit against manipulation for the input of the movement request.

According to the above configuration, when the movement request for positioning the pointer image in the inner edge along the borderline between the first display area and the second display area is inputted to the input unit, the response force applying unit applies the response force, which may oppose the manipulation for the input of the movement request, to the input unit. Therefore, only when the occupant performing the manipulation has the intention of switching the active area, it is likely that the occupant continue to input, against the response force applied by the response force applying unit, the movement request for positioning the pointer image in the inner edge portion. Therefore, in switching the active area, the vehicular display system can reliably reflect the occupant's intention of switching the display position of the pointer image. As a result, it is possible to further improve the operability of the vehicular display apparatus.

The above vehicular display apparatus may be configured in the following way. The display screen has multiple display pixels arrayed thereon. A number of display pixels belonging to the first display area, which is a part of the multiple display pixels arrayed in the display screen, is prescribed in accordance with a number of pixels of the first image generated by the first drawing unit. The second drawing unit generates the second image such that a number of pixels of the second image compensates for a difference in the number of display pixels between the display screen and the first display area.

According to the above configuration, the number of display pixels belonging to the first display area, which is a part of the multiple display pixels arrayed in the display screen, is defined based on the number of pixels constituting the first image generated by the first drawing unit. The second image is generated so as to have the number of pixels that complements for the difference between the number of display pixels belonging to the first display area and the number of display pixels arrayed in the display screen. Therefore, even if the number of pixels of the first image generated by the first drawing unit is smaller than the number of display pixels arrayed in the display screen, the vehicular display apparatus can use all the display pixels in the display screen while using the first image.

In the foregoing configuration, even when the number of display pixels arrayed in the display screen is increased, it is possible to continue to use the existing first rendering unit for generating the first image by adjusting the number of pixels of the second image, which is generated by the second drawing unit. Therefore, an amount of work required to design the vehicular display apparatus can be reduced. As a result, the vehicular display system having high operability can be readily provided.

The above vehicular display apparatus may be configured in the following way. The first drawing unit is a navigation device configured to generate a navigation image as the first image, the navigation image assisting a driving operation of an occupant of the vehicle.

In typical, a navigation device generates a navigation image through highly-complicated processes. Therefore, when the number of pixels constituting the navigation image is increased, it may be necessary to increase the processing capacity of the first drawing unit and it may be necessary to conduct a large amount of work for specification change. However, according to the above configuration, since the vehicular display apparatus can use as the first image the navigation image generated by the existing navigation device, the vehicular display apparatus can cope with the increase in the number of display pixels, and it is possible to keep the processing capacity of the navigation device unchanged, and it is possible to reduce the amount of work for specification change. As a result, the vehicular display system having high operability can be more readily provided.

While the invention has been described above with reference to various embodiments thereof, it is to be understood that the invention is not limited to the above described embodiments and constructions. The invention is intended to cover various modifications and equivalent arrangements.

What is claimed is:

1. A vehicular display apparatus mounted to a vehicle and configured to display a first image generated by a navigation device and a second image generated by a control circuit, the navigation device and the control circuit being separate hardware devices, the vehicular display apparatus comprising:

a display screen that has a first display area displaying the first image and a second display area displaying the second image, the first display area being adjacent the second display area such that the first and second images are displayed side by side, and is configured to display a pointer image on one of the first display area and the second display area, the one being selected as an active area;

an input unit that is configured to receive an input of a user request, the user request including a movement request for moving a display position of the pointer image on the display screen, when the input unit is manipulated to input the movement request for moving the display position of the pointer image on the display screen, the input unit outputs the movement request to a vehicle network and a change request for changing a display manner of the display screen into another display manner, the another display manner being associated with a specific display position of the pointer image; and a switching unit that is configured to, in response to the input of the movement request for moving the display position of the pointer image into an inner edge portion, which extends along a boundary line between the first display area and the second display area, of the active area,
(i) switch the active area from the one of the first display area and the second display area to the other of the first display area and the second display area and
(ii) switch the one of the first display area and the second display area into an inactive area, wherein:

in response to switching the active area from the first display area to the second display area and switching the first display area into the inactive area by the switching unit,
(i) the control circuit starts superimposing the pointer image on the second image and causes the display manner of the second image to be changeable according to the change request at the display position of the pointer image and
(ii) the navigation device stops superimposing the pointer image on the first image;

in response to switching the active area from the second display area to the first display area and switching the second display area into the inactive area by the switching unit,
(i) the navigation device starts superimposing the pointer image on the first image and causes the display manner of the first image to be changeable according to the change request at the display position of the pointer image and
(ii) the control circuit stops superimposing the pointer image on the second image; and in response to the input of the movement request for placing the display position of the pointer image in the inner edge portion of the active area for a period of time longer than a preset period, the switching unit (i) switches the active area from the one of the first display area and the second display area to the other of the first display area and the second display area and (ii) switches the one of the first display area and the second display area into the inactive area;

an inner edge portion of the first display area extends along the boundary line between the first and second display areas;

in response to switching the active area from the first display area to the second display area and switching the inactive area from the second display area to the first display area due to locating the pointer image in the inner edge portion of the first display area for the period of time longer than the preset period, the pointer image disappears from the first display area and appears on the second display area;

the navigation device and the control circuit acquire the movement request from the vehicle network;

only when the first display area is the active area, the navigation device superimposes the pointer image on the first display area out of the first display area and the second display area adjacent to each other on the display screen and changes the display position of the pointer image based on the movement request acquired from the vehicle network; and only when the second display area is the active area, the control circuit superimposes the pointer image on the second display area out of the first display area and the second display area adjacent to each other on the display screen and changes the display position of the pointer image based on the movement request acquired from the vehicle network.

2. The vehicular display apparatus according to claim 1, further comprising:
a response force applying unit,
wherein:
in response to the input of the movement request for moving the display position of the pointer image into the inner edge portion of the active area, the response force applying unit applies a response force to the input unit against manipulation for the input of the movement request.

3. The vehicular display apparatus according to claim 1, wherein:
the display screen has a plurality of display pixels arrayed thereon;
a number of display pixels belonging to the first display area, which is a part of the plurality of display pixels arrayed in the display screen, is prescribed in accordance with a number of pixels of the first image generated by the navigation device; and
the control circuit generates the second image such that a number of pixels in the second image compensates for a difference in the number of display pixels between the display screen and the first display area.

4. The vehicular display apparatus according to claim 3, wherein:
the navigation device is configured to generate a navigation image as the first image, the navigation image assisting a driving operation of an occupant of the vehicle.

5. The vehicular display apparatus according to claim 1, wherein the entire first image and the entire second image are simultaneously displayed on the first and second display areas, respectively.

6. The vehicular display apparatus according to claim 1, wherein the display screen is divided into a first screen area for the first display area and a second screen area for the second display area, the second display area being different than the first screen area.

7. The vehicular display apparatus according to claim 6, wherein the entire first image and the entire second image are simultaneously displayed on the first and second display areas, respectively.

8. The vehicular display apparatus according to claim 1, wherein when the control circuit starts superimposing the pointer image on the second image and the navigation device stops superimposing the pointer image on the first image, the display screen continues to display the entire first image on the first display area.

9. The vehicular display apparatus according to claim 1, wherein:
an inner edge portion of the second display area extends along the boundary line between the first and second display areas; and
in response to the input of the movement request for placing the pointer image in the inner edge portion of the first display area for the period of time longer than the preset period, the switching unit
(i) switches the active area from the first display area to the second display area and switches the inactive area from the second display area to the first display area, and
(ii) causes the navigation device to stop superimposing the pointer image in the inner edge portion of the first display area and causes the control circuit, which is provided separately from the navigation device, to start superimposing the pointer image on a portion of the second display area other than an inner edge portion of the second display area.

10. The vehicular display apparatus according to claim 1, wherein in response to switching the active area from the first display area to the second display area and switching the inactive area from the second display area to the first display area due to locating the pointer image in the inner edge portion of the first display area for the period of time longer than the preset period, the pointer image always disappears from the first display area and appears on the second display area.

11. The vehicular display apparatus according to claim 1, wherein the display screen always displays the first and second images side by side.

12. A vehicular display apparatus comprising:
a display screen
having a first display area displaying a first image generated by a navigation device and a second display area displaying a second image generated by a control circuit provided separately from the navigation device, the first display area being adjacent to the second display area such that the first and second images are displayed side by side, the navigation device and the control circuit being separate hardware devices, and
configured to display a pointer image that is superimposed on the first display area by the navigation device when the first display area is selected as an active area from among the first and second display areas and that is superimposed on the second display area by unit control circuit when the second display area is selected as the active area from among the first and second display areas;
an input unit configured to receive an input of a user request including
a movement request for moving a display position of the pointer image on the display screen, when the input unit is manipulated to input the movement request for moving the display position of the pointer image on the display screen, the input unit outputs the movement request to a vehicle network and
a change request for changing a display manner of the display screen into another display manner, the another display manner being associated with a specific display position of the pointer image; and
a control portion configured to, in response to the input of the movement request for placing the pointer image in an inner edge portion of the first display area, the inner edge portion of the first display area extending along a boundary line between the first and second display areas, for a period of time longer than a preset period,
(i) switch the active area from the first display area to the second display area and switch an inactive area switches from the second display area to the first display area, and
(ii) cause the navigation device to stop superimposing the pointer image on the inner edge portion of the first display area and cause the control circuit, which is provided separately from the navigation device, to start superimposing the pointer image on a portion of the second display area other than an inner edge portion of the second display area, the inner edge portion of the second display area extending along the boundary line between the first and second display areas;
the navigation device and the control circuit acquire the movement request from the vehicle network;

only when the first display area is the active area, the navigation device superimposes the pointer image on the first display area out of the first display area and the second display area adjacent to each other on the display screen and changes the display position of the pointer image based on the movement request acquired from the vehicle network; and only when the second display area is the active area, the control circuit superimposes the pointer image on the second display area out of the first display area and the second display area adjacent to each other on the display screen and changes the display position of the pointer image based on the movement request acquired from the vehicle network.

\* \* \* \* \*

UNITED STATES PATENT AND TRADEMARK OFFICE
CERTIFICATE OF CORRECTION

PATENT NO.         : 9,293,116 B2
APPLICATION NO.    : 13/134939
DATED              : March 22, 2016
INVENTOR(S)        : Yoshitaka Chikahisa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this
Ninth Day of August, 2016

Michelle K. Lee
*Director of the United States Patent and Trademark Office*